United States Patent [19]
Paurat et al.

[11] Patent Number: 5,199,816
[45] Date of Patent: Apr. 6, 1993

[54] SYSTEM FOR ISOLATING A DUMP

[76] Inventors: Friedrich W. Paurat, Kasselweg 29, D-4230 Wesel 1; Roland Paurat, Blumenstrasse 11, D-4230 Wesel 13, both of Fed. Rep. of Germany

[21] Appl. No.: 710,429

[22] Filed: Jun. 5, 1991

[30] Foreign Application Priority Data

| Jun. 12, 1990 | [DE] | Fed. Rep. of Germany | 4018822 |
| Jun. 12, 1990 | [DE] | Fed. Rep. of Germany | 4018824 |
| Aug. 17, 1990 | [DE] | Fed. Rep. of Germany | 4026048 |
| Nov. 13, 1990 | [DE] | Fed. Rep. of Germany | 4036103 |

[51] Int. Cl.$^5$ ............................................. B09B 1/00
[52] U.S. Cl. ..................................... 405/129; 405/55; 405/266
[58] Field of Search ............. 405/36, 38, 43, 53, 405/55, 128, 129, 266–270

[56] References Cited

U.S. PATENT DOCUMENTS

| 4,439,062 | 3/1984 | Kingsbury | 405/129 |
| 4,634,187 | 1/1987 | Huff et al. | 405/53 X |
| 4,753,551 | 6/1988 | Bruggemann et al. | 405/128 |
| 4,846,604 | 7/1989 | Holtmann | 405/128 |
| 4,904,112 | 2/1990 | McDonald | 405/43 X |
| 4,973,196 | 11/1990 | Fuhr et al. | 405/129 |
| 5,043,076 | 8/1991 | Alexander | 405/128 X |
| 5,078,543 | 1/1992 | Terrel | 405/128 |
| 5,080,528 | 1/1992 | Ressi di Cervio | 405/38 |

FOREIGN PATENT DOCUMENTS

| 235353 | 9/1987 | European Pat. Off. | 405/129 |
| 3409591 | 9/1985 | Fed. Rep. of Germany | 405/128 |
| 3617956 | 12/1987 | Fed. Rep. of Germany | . |
| 7107 | 12/1986 | PCT Int'l Appl. | . |

Primary Examiner—Dennis L. Taylor
Assistant Examiner—John Ricci
Attorney, Agent, or Firm—Herbert Dubno; Andrew Wilford

[57] ABSTRACT

A system for isolating a dump sitting on the ground has three different structures which are installed under the dump sequentially, as needed. The first structure includes a tunnel driven longitudinally through the ground underneath the dump and an array of drainage pipes passing through the ground and each having a lower end opening into the tunnel and an upper end at the surface. The second structure includes a water barrier in the ground around at least some of the drainage pipes. The third structure includes a water-impervious mass of backfill in a slit underneath the barrier and having a lower end at the tunnel and an upper end at the surface.

3 Claims, 8 Drawing Sheets

SYSTEM FOR ISOLATING A DUMP

FIELD OF THE INVENTION

The present invention relates to a system for isolating a dump to protect the underlying water table. More particularly this invention concerns a method of thus protecting a water table under a dump.

BACKGROUND OF THE INVENTION

In order to prevent toxic materials in a ground-level or above-ground dump from leaching into the water table underneath the dump, it is known to install under the dump a leach field from which liquids can be drawn, to prevent them from working themselves deeper into the water table. Such a system does not provide a high degree of protection, as liquid can leak past the leach-field pipes. Furthermore such pipes must normally be installed before the dump is made, that is they cannot be installed readily under an existing dump.

It is also known, for example from German patent document 3,617,956 filed 28 May 1986 by Hans Richter to isolate an existing dump by driving under it a succession of tunnels parallel to a central longitudinal tunnel. As each tunnel is driven, a liquid-stopping membrane and/or drainage pipes are installed. The area behind the driving machine is filled with stowing material derived from the face cutter of the machine to prevent caveins, and any excess such material, which may be stone, earth, or clay depending on the ground composition, is conveyed to the surface. Such a procedure is extremely complex and expensive.

In another known system two slit tunnels are driven directly under the dump by longwall-mining techniques, starting from a central longitudinal service tunnel. This forms a basically horizontal barrier directly underneath the dump that can be provided with a vapor barrier and/or a drainage system. Horizontally lateral leaching of pollutants in the dump can still take place, unless expensive vertical slit shafts are subsequently cut to join with the outer edges of the horizontal slit and thereby fully isolate the dump.

A significant problem with the known dump-isolating systems is that they require that the geology underneath the dump be meticulously surveyed to determine the percolation rate, presence of aquifers, and so on in order to be able to apply the correct solution. Furthermore the known systems are often more elaborate than what is necessary to do the isolating job, so that value is lost.

OBJECTS OF THE INVENTION

It is therefore an object of the present invention to provide an improved method of and system for isolating a dump.

Another object is the provision of such an improved method of and system for isolating a dump which overcomes the above-given disadvantages, that is which is relatively simple yet which completely isolates the dump.

SUMMARY OF THE INVENTION

A system for isolating a dump sitting on the ground according to this invention has three different structures which are installed under the dump sequentially, as needed. The first structure includes a tunnel driven longitudinally through the ground underneath the dump and an array of drainage pipes passing through the ground and each having a lower end opening into the tunnel and an upper end at the surface. The second structure includes a water barrier in the ground around the drainage pipes. The third structure includes a water-impervious mass of backfill in a slit underneath the barrier and having a lower end at the tunnel and an upper end at the surface.

The tunnel is generally centered under the dump and the first structure has two such arrays of drainage pipes opening into opposite sides of the tunnel, the third structure including two such masses of backfill in such slits also opening into opposite sides of the tunnel. In addition the first structure can include a second array of drainage pipes passing through the ground above the first-mentioned array and each having a lower end opening into the tunnel and an upper end at the surface. This second array lies above the barrier of the second structure. The third structure includes a layer of a liquid barrier in the slit.

Thus according to this invention first of all a tunnel is driven longitudinally through the ground underneath the dump and an array of drainage pipes is installed in the ground with each one having a lower end opening into the tunnel and an upper end at the surface. A water barrier is provided in the ground around the drainage pipes and underneath the barrier a slit is cut having a lower end at the tunnel and an upper end at the surface. Then the slit is backfilled with a water-impervious mass.

With this arrangement the service tunnel is driven by a standard tunneling machine, normally entering the ground at some longitudinal spacing from one end of the dump and coming back out of the ground at a similar longitudinal spacing from the opposite end of the dump. Then the drainage pipes are installed using standard well-drilling equipment that bores a hole and installs behind the drill a perforated casing. Cores obtained as these holes are bored down from the surface to the tunnel give the system operators a exact knowledge of all underground structures. If, for instance, it is determined that a certain area is formed of solid water-impervious rock, no further protection is needed in this area. These drainage pipes in any case serve as zero-pressure sumps so that under normal circumstances it will be impossible for any significant liquid to leach past them. Of course if this first structure offers insufficient protection, the second structure is added, and if it is not sufficient, the third is added.

According to a further feature of this invention a service tube is installed inside each drainage pipe. The service tubes and drainage pipes have perforations and the water barrier is provided around the drainage pipes by injecting it from the perforations of the service tubes and drainage pipes.

Furthermore according to the invention the slit is cut by longwall-mining techniques using a mining machine moving in passes transverse to the tunnel and cutting rock that is conveyed down to the tunnel and thence to the surface. The roof of the slit is propped up behind the machine.

BRIEF DESCRIPTION OF THE DRAWING

The above and other objects, features, and advantages will become more readily apparent from the following, reference being made to the accompanying drawing in which.

SPECIFIC DESCRIPTION

As seen in FIGS. 1 through 4 a dump 1 according to this invention sitting on or in the ground G is isolated by first driving a tunnel 2 underneath it, with the tunnel 2 starting at some spacing to one longitudinal side of the dump 1, angling downward, passing horizontally underneath the dump 1, and then angling upward and exiting at some spacing to the opposite side of the dump 1. Then as seen two arrays of drainage pipes 3 are installed, with the pipes 3 running from above-ground ends 4 transversely flanking the dump 1 to lower ends opening into the tunnel 2. The ground around these pipes 3 may then be stabilized as indicated at 5 to render it substantially impassable to water.

Figure 1:
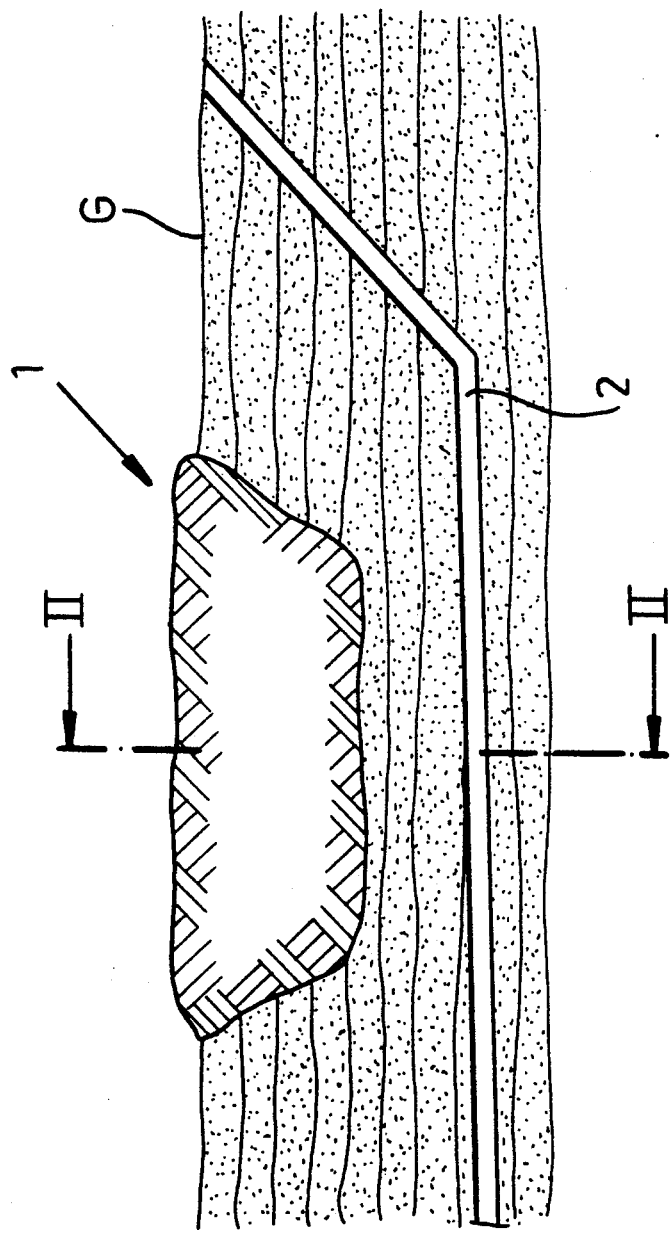
FIG. 1 is a longitudinal section through a dump isolated according to the invention.
Figure 2:
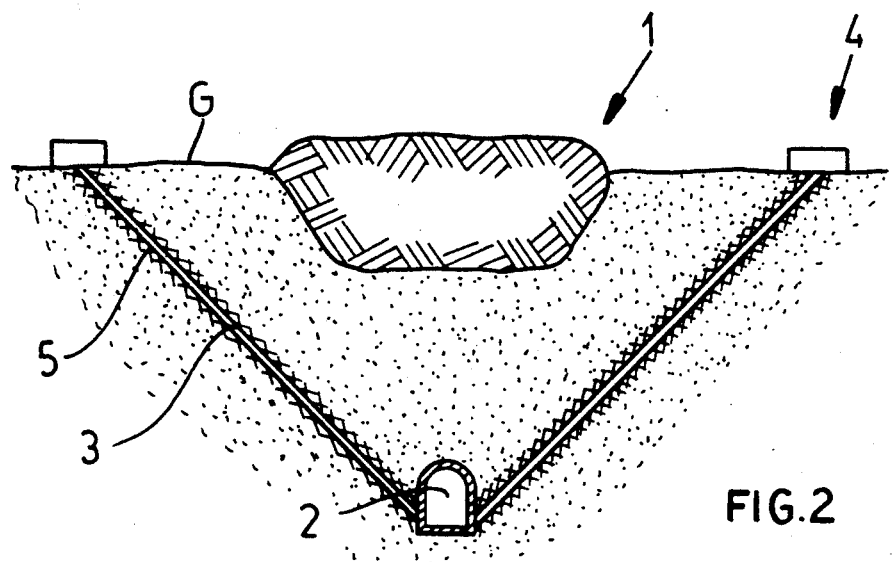
FIG. 2 is a cross section taken along line II—II of FIG. 1 showing the first structure.
Figure 3:
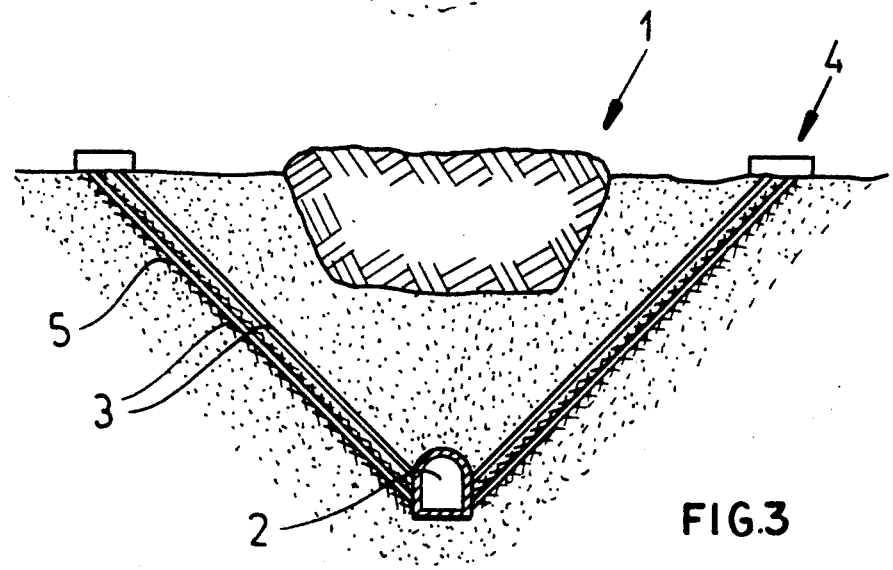
FIGS. 3 and 4 are sections like FIG. 2 showing the second and third structures of this invention.

Then above each such row of pipes 3 another such row of pipes 3 is installed as seen in FIG. 3, above the waterproofed layer 5. Thus any liquid percolating down from the dump 1 will normally be caught by the upper pipes 3 and drained off to the tunnel 2.

Figure 4:
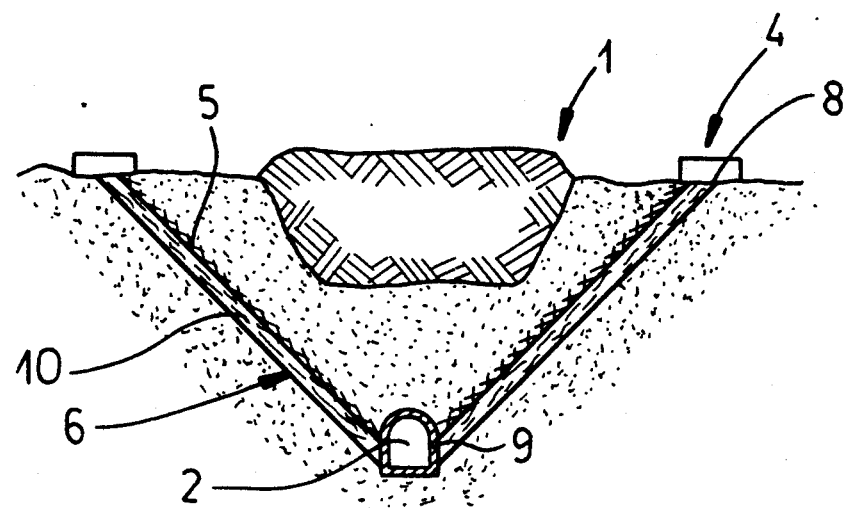

FIG. 4 shows how it is subsequently possible, if circumstances warrant, to cut a slit 6 to each side of the dump 1, with the slits 6 underlying the arrays of pipes 3. These slits have upper ends opening at 8 adjacent the pipe upper ends 4 and lower ends at 9 at the tunnel 2 and are backfilled as indicated at 10. These backfilled slits 6 extend the full length of the tunnel 2 so that they form with this tunnel 2 an enclosure shaped like a boat hull under the dump 1.

Figure 5:
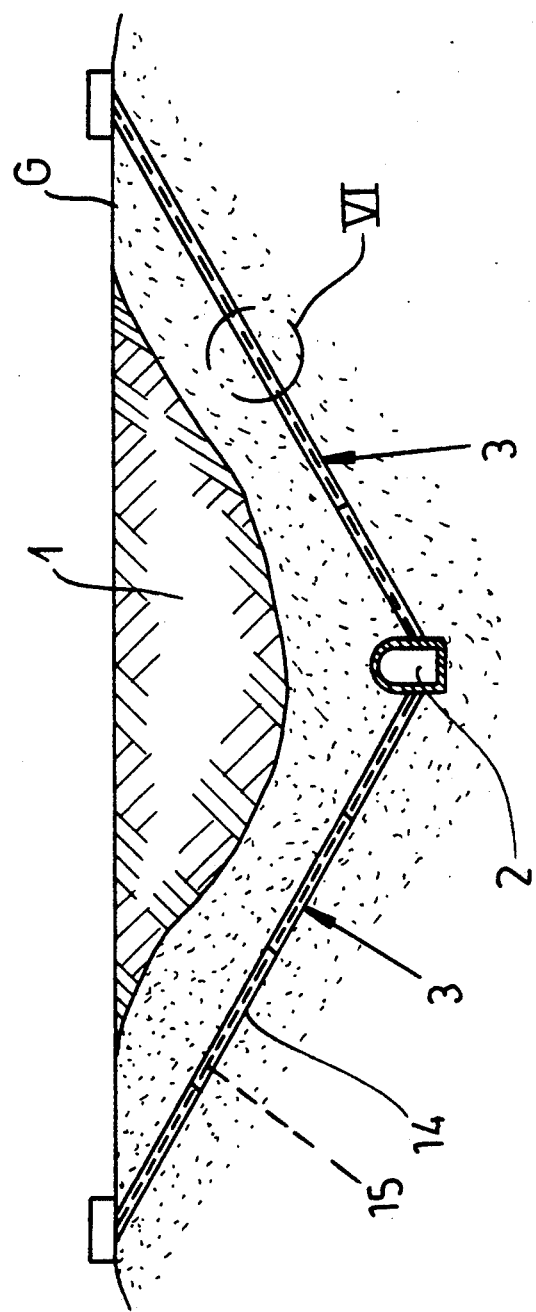
FIG. 5 is a section like FIG. 2 showing further details of this invention.
Figure 6:
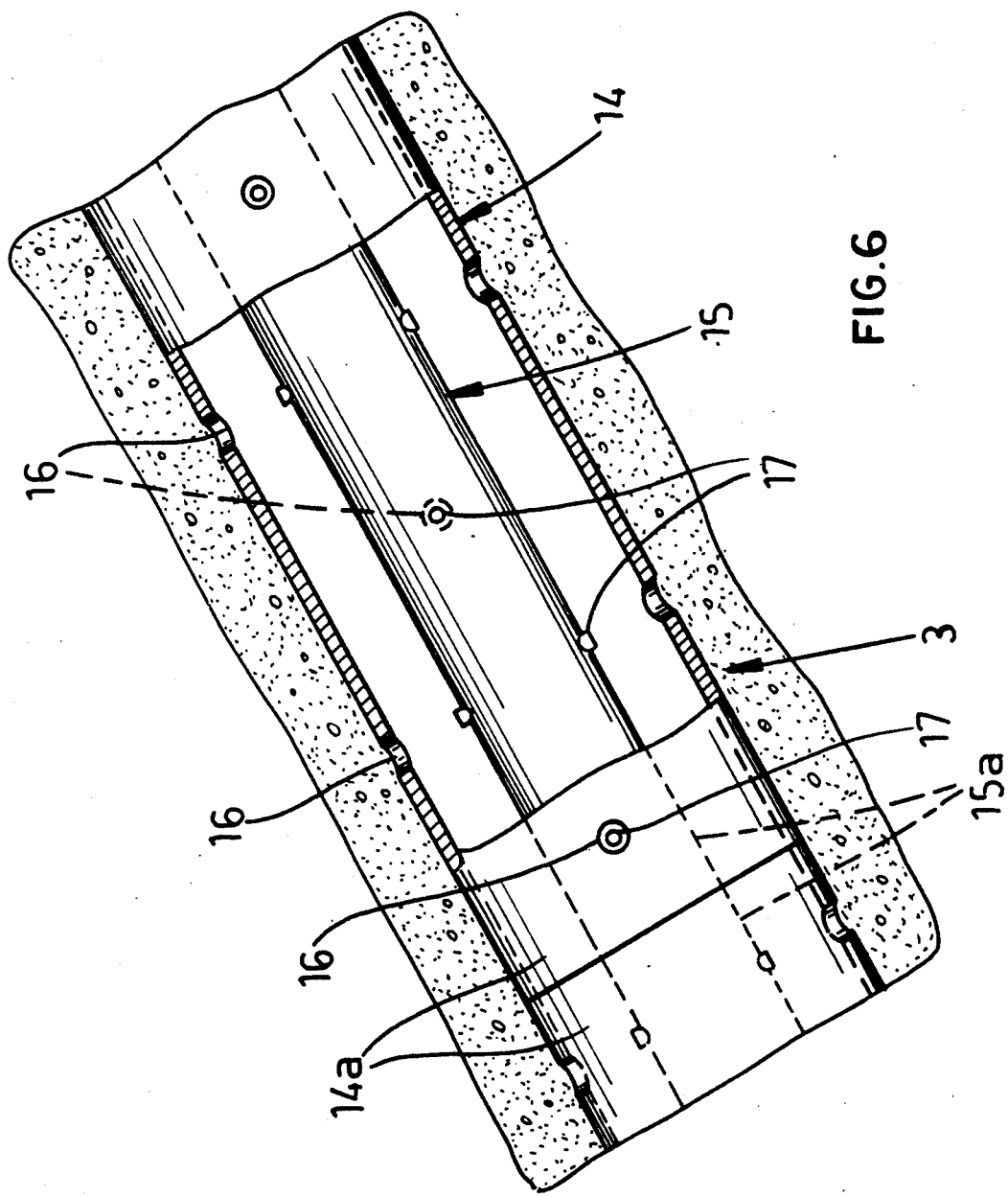
FIG. 6 is a large-scale view of the detail indicated at VI in FIG. 5
Figure 7:
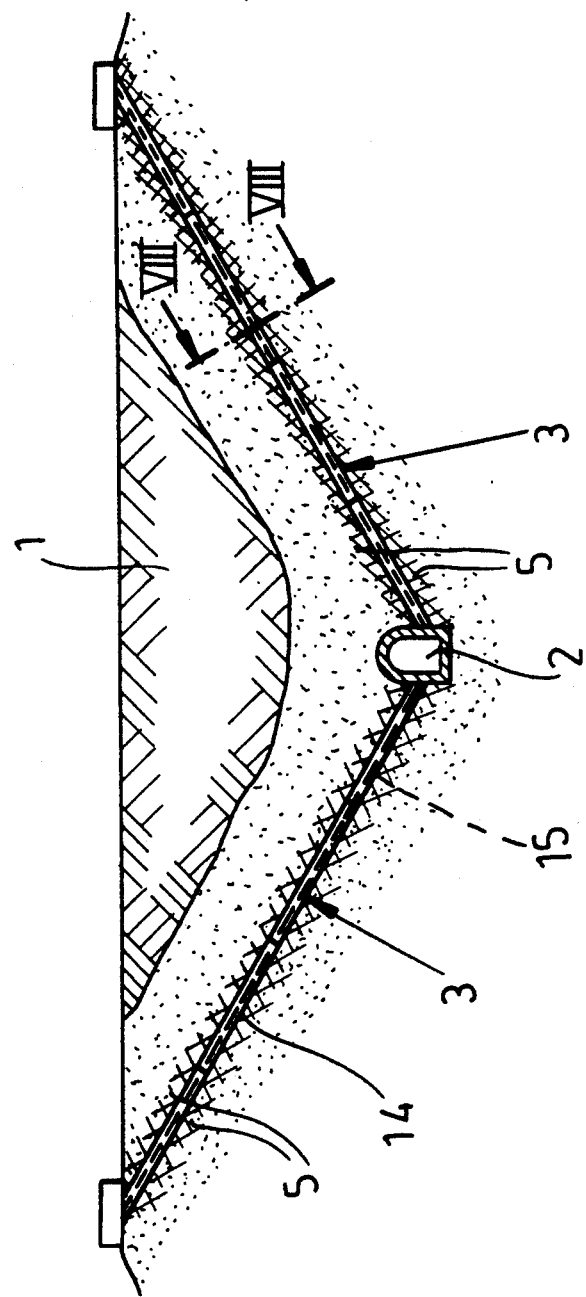
FIG. 7 is another section like FIG. 5 showing the second structure.
Figure 8:
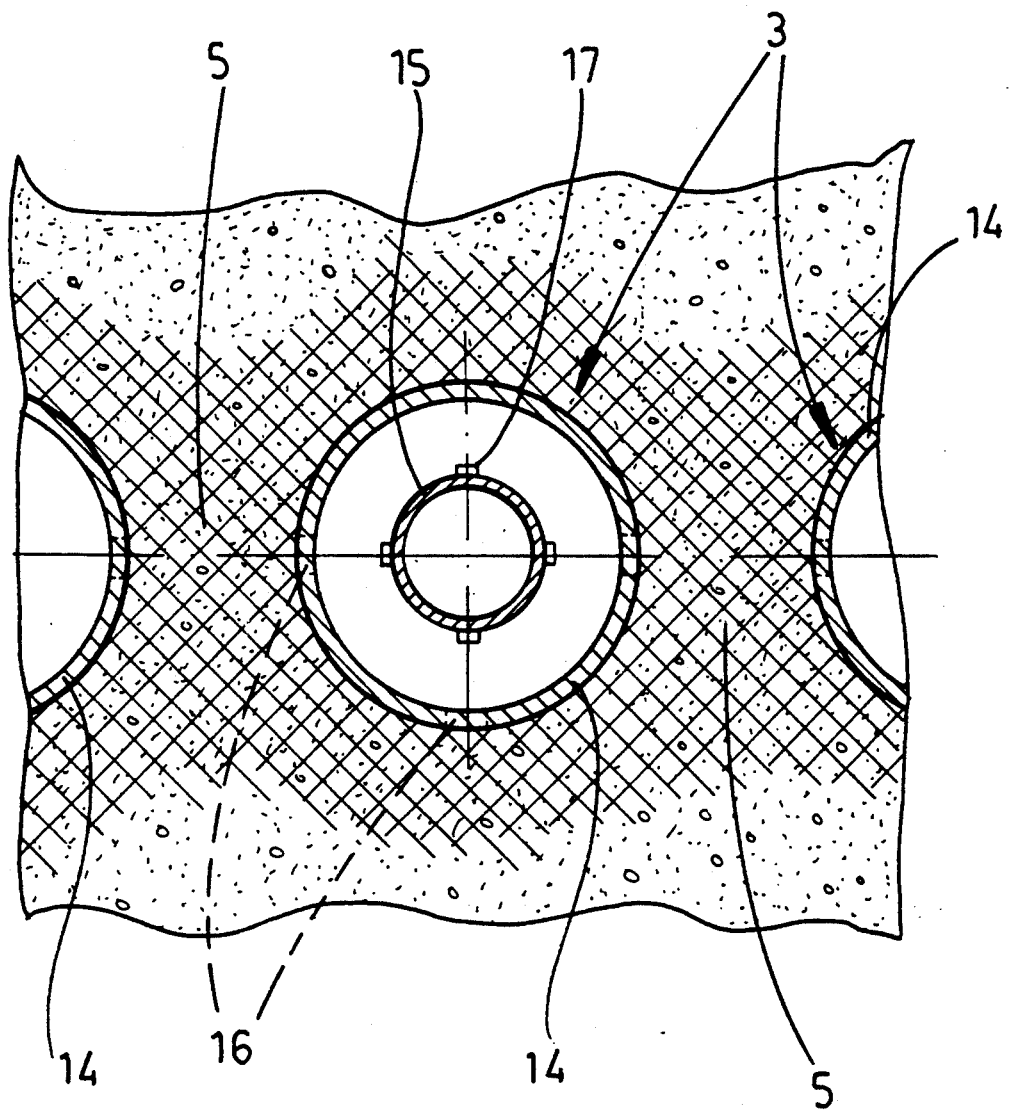
FIG. 8 is a large-scale section taken along line VIII—VIII of FIG. 7.

The drainage pipes 3 each comprise as seen in FIGS. 5 and 6 an outer perforated casing 14 formed of successive pipe sections 14a and having holes 16 and an inner tube 15 formed similarly of successive welded-together pipe sections 15a and formed with nozzles 17 aligned with the holes 16. The casing 14 is installed following the rotary drill head as in standard oil-drilling procedures and the inner tube 17 is slipped in afterward. The inner tube 15 can be used as illustrated in FIGS. 7 and 8 to inject material, for instance drilling mud containing portland cement, into the surrounding ground to form the water barrier 5. Similarly the tube 15 can be used to suck out downwardly percolating liquid when in the upper arrays of pipes 3.

Figure 9:
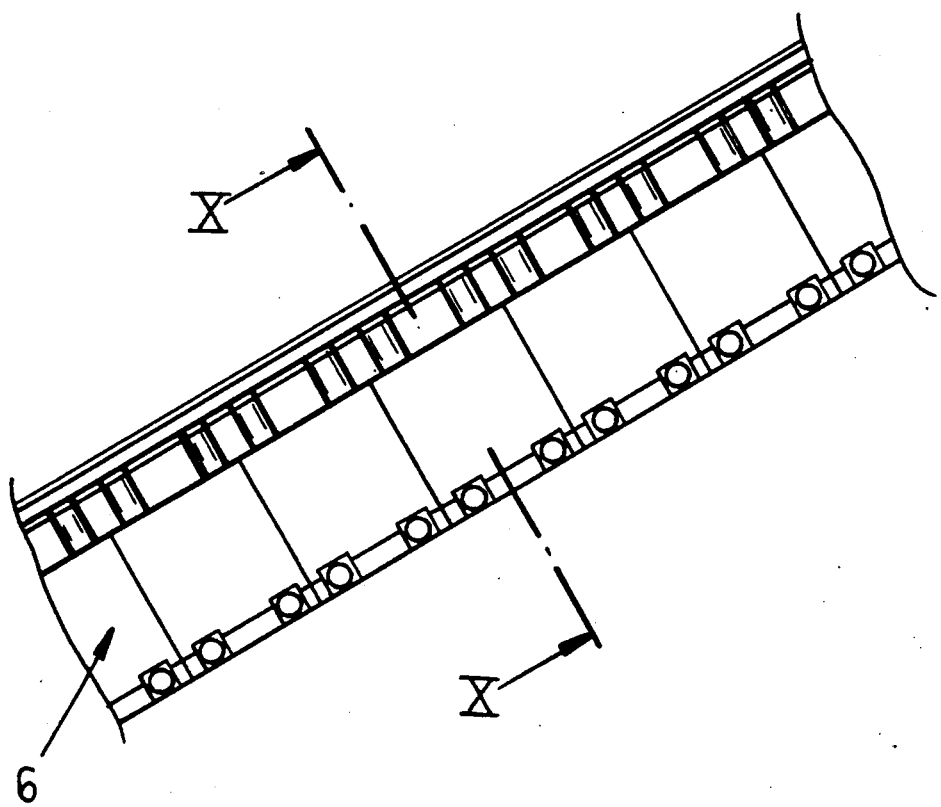
FIG. 9 is a large-scale view of the detail indicated at IX—IX of FIG. 4.
Figure 10:
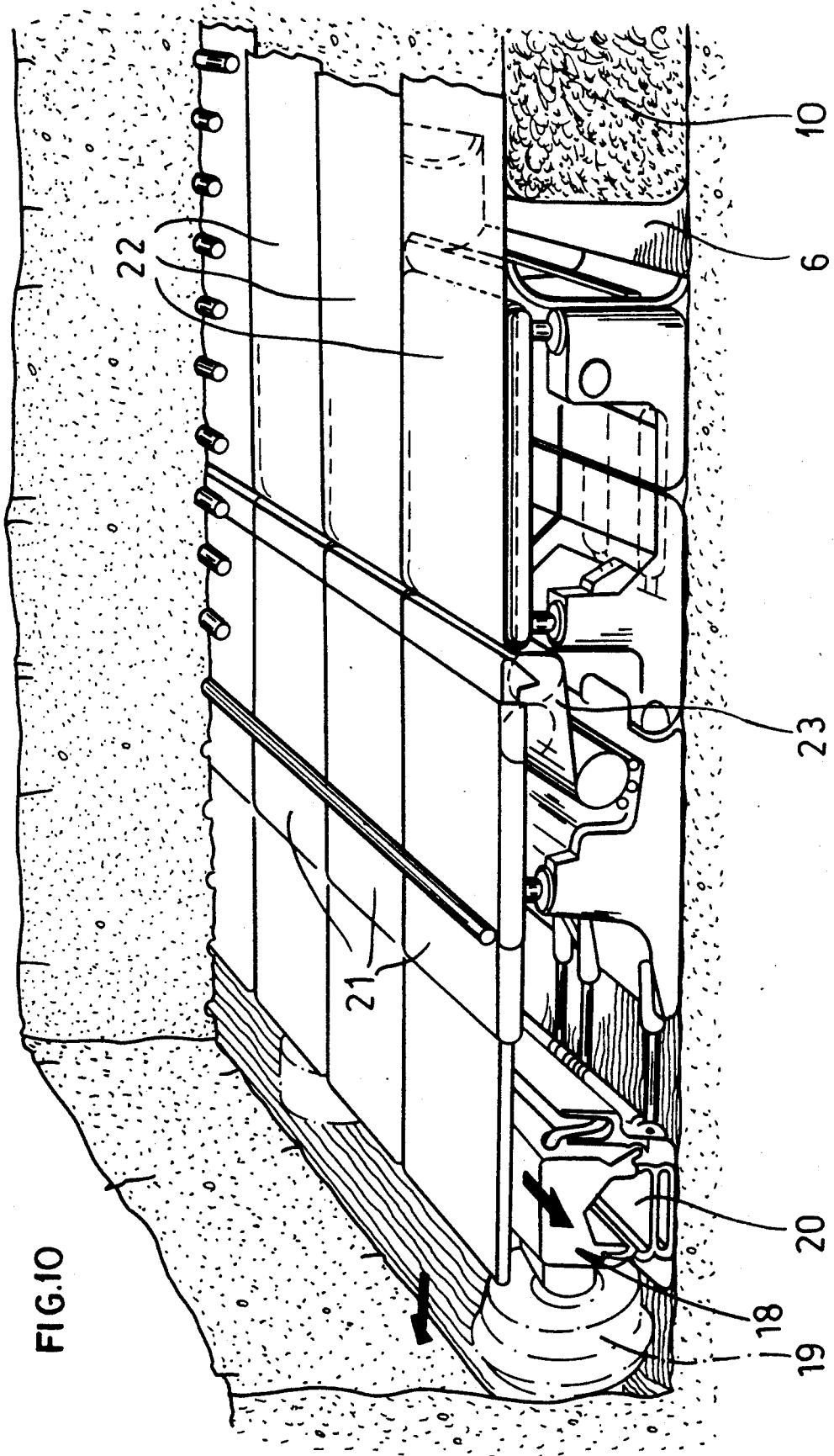
FIG. 10 is a partly perspective section illustrating the machine for cutting the slits according to the invention.

As seen in FIGS. 9 and 10 the slits 6 are cut by a standard longwall-mining machine of the type used to win a seam of coal. This machine has a cutter 18 provided with toothed heads 19 that feed the cut-away material to a conveyor 20 that moves it downhill to the tunnel 2 whence it is moved longitudinally and then upward to the surface. Behind the cutter 18 are front props 21 and rear props 22 that hold up the roof of the cut. A coil 23 of a vapor-barrier sheet is carried on the props 21 to unroll this material behind the machine as same advances longitudinally, thereby improving the water-blocking capacity of the barrier 5.

We claim:

1. A method of isolating a dump sitting on the ground, the method comprising the steps of:
    driving a tunnel driven longitudinally through the ground underneath the dump;
    installing an array of perforated drainage pipes through the ground and each having a lower end opening into the tunnel and an upper end at the surface;
    installing a perforated service tube inside each drainage pipe;
    providing a water barrier in the ground around the drainage pipes by injecting waterproofing material into the ground around the drainage pipes from the perforations of the service pipes and drainage pipes;
    cutting underneath the barrier a slit having a lower end at the tunnel and an upper end at the surface; and
    backfilling the slit with a water-impervious mass.

2. The dump-isolating method defined in claim 1 wherein the slit is cut by longwall-mining techniques using a mining machine moving in passes transverse to the tunnel and cutting rock that is conveyed down to the tunnel and thence to the surface.

3. The dump-isolating method defined in claim 2, further comprising the step of
    propping up a roof of the slit behind the machine.

* * * * *